United States Patent

Schierz

[15] 3,691,629

[45] Sept. 19, 1972

[54] METHOD FOR PRODUCING SEMICONDUCTOR RECTIFIER ARRANGEMENTS

[72] Inventor: Winfried Schierz, Roth b. Nurnberg, Germany

[73] Assignee: Semikron Gesellschaft fur Gleichrichterbau und Elektronick m.b.H., Nurnberg, Germany

[22] Filed: Dec. 23, 1970

[21] Appl. No.: 101,088

[30] Foreign Application Priority Data

Dec. 23, 1969 Germany..........P 19 64 481.6

[52] U.S. Cl...................29/577, 29/588, 174/DIG. 3, 29/591

[51] Int. Cl.............................B01j 17/00, H01l 1/16

[58] Field of Search........29/577, 589, 591, 588, 627, 29/471.1

[56] References Cited

UNITED STATES PATENTS

| | | | |
|---|---|---|---|
| 3,065,525 | 11/1962 | Ingraham et al | 29/190 |
| 3,391,456 | 7/1968 | Gannoe | 29/625 |
| 3,577,633 | 5/1971 | Homma | 29/588 |

*Primary Examiner*—John F. Campbell
*Assistant Examiner*—W. Tupman
*Attorney*—Spencer & Kaye

[57] ABSTRACT

An improved method of simultaneously making a plurality of semiconductor rectifier circuit arrangements of the type wherein semiconductor rectifier wafers are selectively inserted at the points of overlap of two planar conductors which then contact the opposite surfaces of the wafers. According to the method of the invention a pair of planar partial conductor bands are formed from a strip of planar conductive material so that each band contains a periodically repeating pattern of conductors which are formed so that associated patterns on the two bands will form the desired circuit arrangement when placed on top of one another. Each of the bands is formed so that its conductors extend from a common edge zone which may be utilized as a transport strip with the conductors of a first of the bands being provided with planar sections which can hold and support a semiconductor wafer. The wafers are then placed at the desired locations on the provided sections of the first partial conductor band, the other partial conductor band is then placed thereover with the proper orientation so that each wafer is between an overlapping pair of conductors and contacted on both of its surfaces, and then the two partial conductor bands are mechanically fastened together by means of their edge zones. The resulting structure is then subjected to the further processing steps of permanently bonding the wafers to the contacting conductors, cutting or separating the conductor pattern, if required, into the desired circuit arrangements and encapsulating of the individual rectifier devices. Finally, the conductors are severed from the common edge zone.

10 Claims, 13 Drawing Figures

FIG. I

INVENTOR
Winfried Schierz

BY Spencer & Kaye
ATTORNEYS.

INVENTOR
Winfried Schierz

BY Spencer & Kaye
ATTORNEYS.

INVENTOR
Winfried Schierz

BY Spencer & Kaye
ATTORNEYS.

INVENTOR
Winfried Schierz

BY Spencer & Kaye
ATTORNEYS

METHOD FOR PRODUCING SEMICONDUCTOR RECTIFIER ARRANGEMENTS

BACKGROUND OF THE INVENTION

The present invention relates to an improved method of producing semiconductor rectifier devices. In particular this invention relates to an improved method of simultaneously and economically producing a plurality of rectifier devices of the type wherein semiconductor rectifier or diode wafers are placed between overlapping conductor portions of the circuit arrangement.

Because of the increased range of application of semiconductor rectifier arrangements or devices of small power output and the smaller dimensions required, efforts are continually being made to produce such devices as economically as possible.

According to one known method for producing rectifier arrangements of small power output, the individual prefabricated strip-shaped conductor portions of the device are arranged to be mutually overlapping and semiconductor wafers of predetermined electrical orientation are inserted at the cross-over points of the conductor portions and are contacted therewith. The resulting structure is then encased in a mass of cast insulating material. The process expenditures required for this type of production, however, often do not meet the requirements which must be met for economical manufacture of such arrangements.

It has also been proposed to simultaneously form the conductor portions for a plurality of such rectifier arrangements from a strip or band of conductive material, for example by stamping, so as to provide a planar conductor tape or band having periodically repeated zones which are connected together, if required, via a longitudinal edge zone which serves as the transporting strip. Each of the conductor zones contains all of the conductive portions, as to their number and geometric configuration, required by the given electrical circuit of the rectifier arrangements. The associated conductor sections intended for contacting each semiconductor wafer are arranged to be appropriately offset in space to form a clamp-type mount. Such a tape-type construction is then subjected to a succession of process steps for manufacturing rectifier arrangements containing a predetermined number of semiconductor wafers.

When such specially constructed conductor tapes are used, it has been found that the contact surface of certain conductor sections intended for connection with a semiconductor wafer is smaller than the associated contact surface of the semiconductor wafer so that the thermal operation behavior of such rectifier arrangements does not satisfy all possible cases of application. Moreover, particularly in devices having rather small-area semiconductor wafers, due to the correspondingly small contact section of the conductor portions, the insertion of the wafers between the conductors of the conductor tape or band is often difficult and time consuming and thus, relatively expensive.

SUMMARY OF THE INVENTION

It is, therefore, the object of the present invention to eliminate the above-mentioned difficulties and to provide an improved method whereby such rectifier arrangements can be manufactured in a particularly economical manner and which maintains the advantages connected with the use of tape-type conductor material for the formation of the conductive portions of the devices.

The present invention thus relates to a method for producing semiconductor rectifier arrangements in which strip-shaped current conductor portions intended for connection with semiconductor wafers are arranged to be mutually overlapping in a relationship determined by the desired rectifier circuit and wherein a semiconductor wafer is provided at each point of overlap, is inserted between the conductor portions and contacted with these and is then subjected to further process steps in this construction. The invention consists in that, for the simultaneous and economical fabrication of a plurality of semiconductor rectifier arrangements, a first planar partial conductor tape or band is produced which has an edge zone which is suitable to serve as a transporting strip, and which is provided with periodically repeating conductor portions, connected together by the edge zone, which are provided with sections for the planar application and support of semiconductor wafers. A second planar partial conductor tape or band is produced having periodically repeating conductor portions connected to an edge zone, which band has a shape determined by the design of the first tape and by the desired rectifier circuit, for providing planar contact with the contact surfaces of the semiconductor wafers. The semiconductor wafers are placed on the provided sections of the first partial conductor band and then the second partial conductor band is placed thereover with the proper orientation or alignment so as to contact the semiconductor wafers. Both partial conductor tapes are mechanically connected together via their edge zones and the tape structure consisting of the semiconductor wafers and partial conductor tapes contacting these wafers on both sides thereof and connected with each other are subjected to further known process steps for contacting, separating and encapsulating.

FIGS. **10*a*–10*d*** illustrate the construction of a rectifier element consisting of two identical partial conductor bands according to the method of the invention.

DESCRIPTION OF THE PREFERRED EMBODIMENTS

Figure 1:
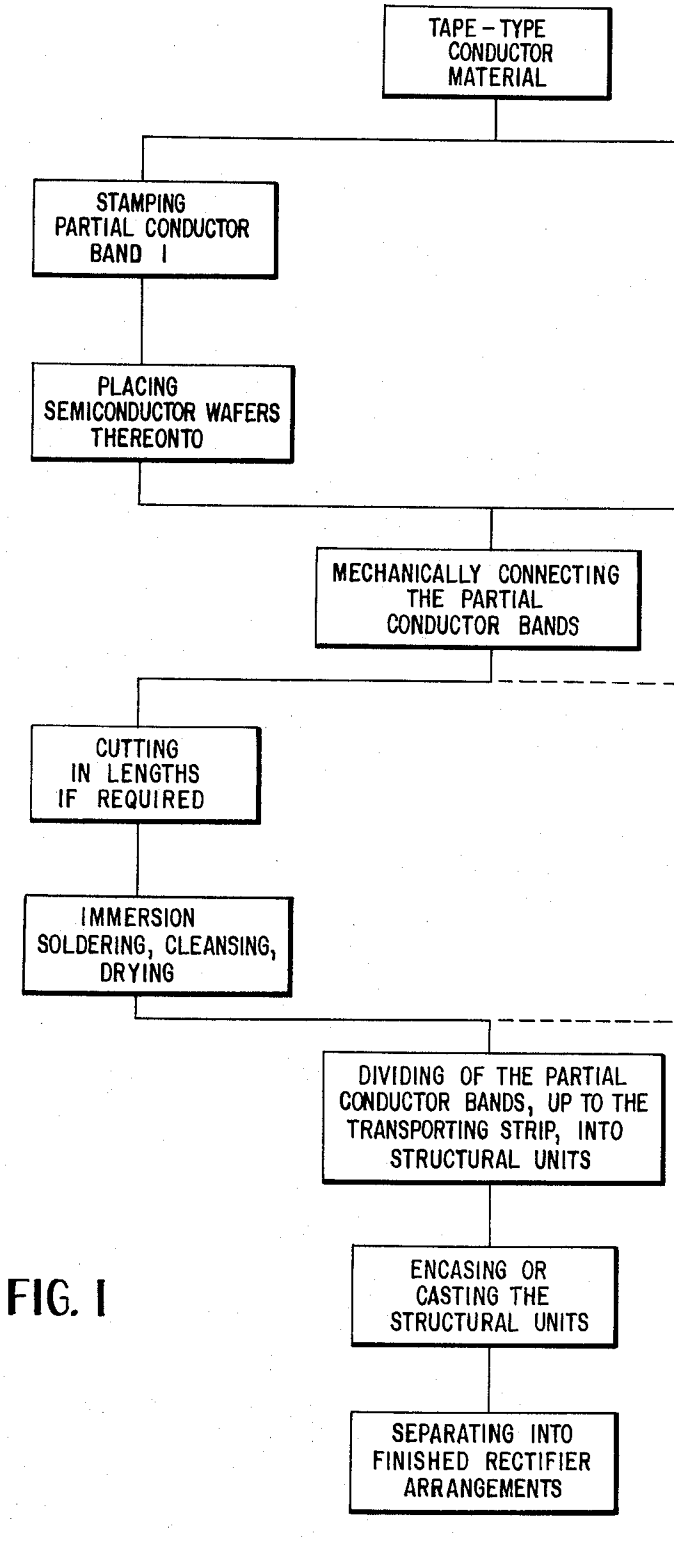
FIG. 1 is a flow diagram of a method according to the invention.

Referring now to the figures, wherein the same parts bear the same reference numerals in all figures, as indicated in FIG. 1, the first step in the method is to produce or form a first planar partial conductor band from a tape-type, thermally and electrically conductive material, preferably by stamping. This partial conductor band, e.g., the band 1 of FIG. 2, consists of a longitudinal edge zone 10 which also serves, if required, as a transporting strip and of a series of small plates or sections 111 aligned along the edge zone of the tape and connected therewith via strip-shaped conductor portions 121 which serve as the current conductive connections for the completed device. The plates or sections 111 serve as planar mounts for the semiconductor wafers. Preferably, in the same process step, these plates are provided with a suitable, preferably round, recess or indentation to indicate the proper position of each semiconductor wafer and to more securely hold it in place. Such an indentation is indicated, for example, in FIG. 2 for sections 111 of partial conductor band 1 by the reference numeral 13. In a subsequent process step, the plates or sections of this first partial conductor tape are provided with semiconductor wafers.

Figure 2:
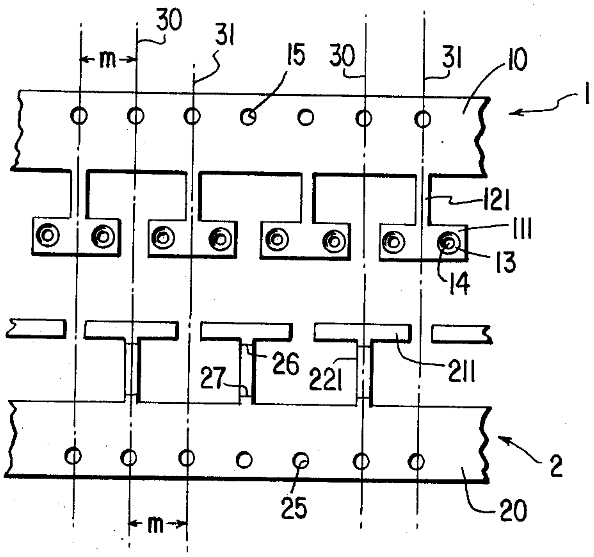
FIG. 2 illustrates the configuration of two partial conductor bands for forming a rectifier circuit according to the method of the invention.

Separately from the production of first partial conductor band, a second planar partial conductor tape, e.g., the tape 2 of FIG. 2, is produced out of the same material and in a corresponding manner and is provided with the other conductor portions required for contacting the semiconductor wafers as determined by the geometric configuration of the first tape. This second partial conductor band is placed onto the first partial conductor band provided with the semiconductor wafers in an association determined by the contacting intended for the semiconductor wafers, and in such a manner that the respective partial conductor sections are in planar contact with the contact surfaces of each semiconductor wafer. For economical further processing, the two partial conductor bands are mechanically connected together, preferably permanently, at suitable places. Preferably, the two partial conductor bands are permanently connected together within the longitudinal edge zones, for example, by point welding. The resulting structure, which is shown, for example, in FIG. 3, in which the semiconductor wafers are each disposed between the associated conductor portions of the two partial conductor tapes, is extremely well suited for the application of further process steps in a very simple manner.

The next step in the process is to permanently connect, e.g., by soldering, the semiconductor wafers to the associated conductors of the two partial conductor bands. Preferably, as illustrated in FIG. 1 this is done in an immersion soldering process. In order, however, to solder contact the semiconductor wafers held between their current conductor portions by means of immersion soldering, the tape-type arrangement is first divided into lengths suitable for such a soldering process and for ease in handling. These lengths are then immersed in soldering flux and then into a solder bath, following which they are then subjected to a cleansing process. After subsequent drying, the conductor bands, except for the transporting strips, i.e., the edge zones, of each of these lengths is divided, if required by the conductor patterns, into desired sections to form the intended rectifier circuits. The individual rectifier circuits are then encapsulated and finally the conductors are separated from the transport strip.

As also indicated in FIG. 1, the solder contacting of the semiconductor wafers may alternatively be performed with the aid of a heat treatment, for example a so-called oven soldering or hot gas soldering or by clamping between heated metal surfaces. Cleansing and drying processes are then unnecessary. The further process steps up to the final checking can then be performed in the above-mentioned manner.

In the above-described process semiconductor wafers, sometimes called "sandwiches," which consist of a semiconductor wafer and contacting plates permanently connected therewith on both sides, and which are appropriately prepared for the intended soldering processes are utilized. If, however, semiconductor wafers and contacting plates are employed as individual components, the structure produced by mutual soldering and simultaneous contacting with the conductor portions is separately subjected to separate known process steps for etching and surface stabilization of the semiconductor wafers which usually requires suitable pretreatment for all individual components. In order to protect these conductor portions against undesired etching agent attacks, the surfaces which are not to be treated are covered with a suitable known protective lacquer.

The strip-shaped conductive material utilized for the conductor consists of a metal having good conductive properties, for example copper, brass or an iron-nickel-cobalt alloy and may be covered with a solderable coating depending on the type of soldering process to be employed. The thickness of the conductive material depends on the current load capability of the intended rectifier arrangements and on the production requirements and lies at approximately 0.2 to 0.6 mm. The width of the partial conductor tape is determined by the configuration of the conductor portion for the desired rectifier circuit and of the additionally provided transporting strip.

The partial conductor bands may also be produced by etching, if desired. In such an event, the plates or sections of the first conductor band are provided with the indentations 13 suitable for holding the semiconductor wafers in a separate process after the etching process.

The semiconductor wafers may be placed onto the first partial conductor or bands either manually or automatically in a suitable operating sequence which then relates in an advantageous manner to the process steps of stamping, placing the wafers on the tape, soldering and separating into lengths.

Referring now specifically to FIG. 2 there is shown two planar partial conductor bands or tapes 1, 2 which are disposed parallel to one another and with their partial conductor regions facing one another and offset or staggered with respect to staggered one another. Partial conductor tape 1 is provided with contact pieces, plates or sections 111 which are connected with the edge zone or transporting strip 10 via strip-shaped protrusions or conductors 121, are disposed in parallel with the transporting strip 10 and serve as supporting plates providing respectively two indentations 13 for insertion of a semiconductor wafer each. The partial conductor band 2 similarly has an edge zone or transporting strip 20 with conductors 221 having stripe-shaped contacting portions 211. In the particular illustrated circuit arrangement, the sections of each of the partial conductor bands 1 and 2 consisting of contact pieces or sections 111 or 211, respectively and strip-shaped conductors 121 or 221, respectively have a T shape and are so adapted that with predetermined positioning of the partial conductor bands 1 and 2 on top of one another with coinciding transporting strips 10, 20, one contact section 211 will cover the indentation 13 of one carrier plate 111 and the adjacent indentation of the following carrier plate, and that the strip-shaped conductors 221 of partial conductor tape 2, which serve as current leads, are always disposed at the same spacing between two conductor portions 121. This is shown in FIG. 3 for the partial conductor bands 1 and 2 shown individually in FIG. 2 after they have been placed together.

In order for all current leads 121, 221 in the finished device to be disposed in one plane, the leads of partial conductor band 2 are bent at points 26, 27 to a degree determined by the layer structure or thickness of a contacted semiconductor wafer. The bending is preferably accomplished during the formation of the partial conductor band from the strip of conductive material. For economical fabrication, the transporting strips 10, 20 may be provided with perforations 15, 25 or other suitable markings at a spacing *m* which coincides for both partial conductor tapes which aids in the alignment thereof. Additionally, to enhance the soldering process between semiconductor wafers 6 and carrier plates 111, a bore or hole 14 is preferably provided at the bottom of the indentation 13.

The areal expanse of carrier plates or sections 111 and contact pieces 211 is determined by the semiconductor wafers and the intended use for the rectifier arrangements to be produced. Conductor portions 121, 221 are constructed in their portion outside of the housing, insofar as concerns expanse and configuration, in a manner suitable for any type of circuit.

Figure 3:
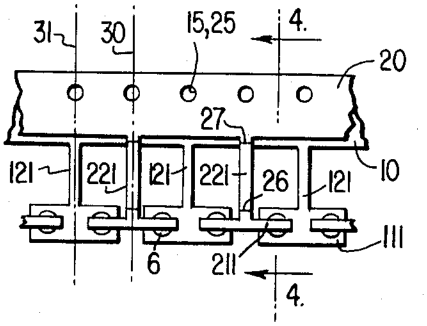
FIG. 3 illustrates the mutual relationship of the two bands of FIG. 2 after placement of the semiconductor wafers and connection together of the two bands.

The structure shown in FIG. 3, which is obtained by appropriate placement of the partial conductor bands 1 and 2 according to FIG. 2 on top of one another, results in a plurality of rectifier arrangements each containing one semiconductor wafer 6, if separation is made along all of the lines 30 and 31. To produce rectifier arrangements having two semiconductor wafers with a center connection the structure of FIG. 3 is separated only along all of the lines 31 associated with conductor portions 121. With sufficient dimensioning of conductor portions 121, 221 the conductor strips remaining along these conductor portions after separation are suited as current leads as regards their stability and load capability.

Figure 4:
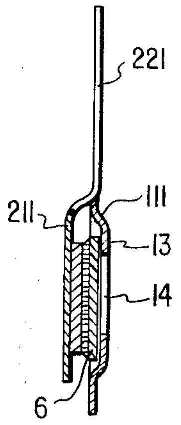
FIG. 4 is a sectional view along the line 4—4 of FIG. 3 showing the semiconductor wafer held between the conductors of the two bands.

The arrangement of a semiconductor wafer 6 intended for use in the process of the present invention and disposed between its conductor portions 111, 121 and 211, 221, respectively, is shown in FIG. 4.

Figure 5:
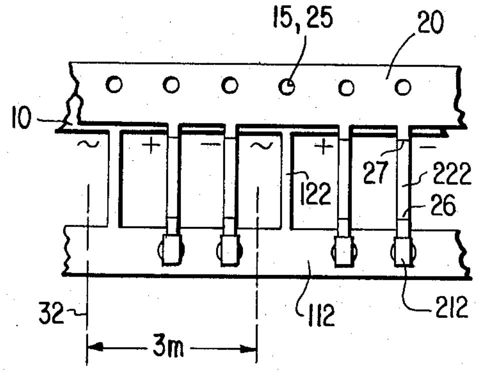
FIG. 5 is an illustration of the mutual relationship between the two partial conductor bands for a half single phase bridge rectifying circuit constructed according to the method of the invention.

FIG. 5 shows the partial conductor band structure according to the method of the invention for a different type of rectifier circuit. The structure shown in FIG. 5 is suitable for producing a rectifier arrangement in one half of a single-phase bridge connection. In this embodiment, the partial conductor band 1 consists of a transporting strip 10, a continuous carrier strip or section 112 parallel thereto for holding the wafers and conductor portions 122 which connect these strips 10 and 112 and which are determined in their arrangement by the desired circuit arrangement and the subdivisions. The partial conductor band 2 disposed thereon consists of transporting strip 20 and contact pieces 212, which serve for the planar contacting of the semiconductor wafers and which are connected with the transporting strip 20 via strip-shaped conductor portions 222. The expanse and configuration of the band 2 is determined by the partial conductor tape 1 and the intended circuit. To provide the desired circuits, separation into individual circuit units is accomplished along lines 32 at a spacing of 3 *m*.

Figure 6:
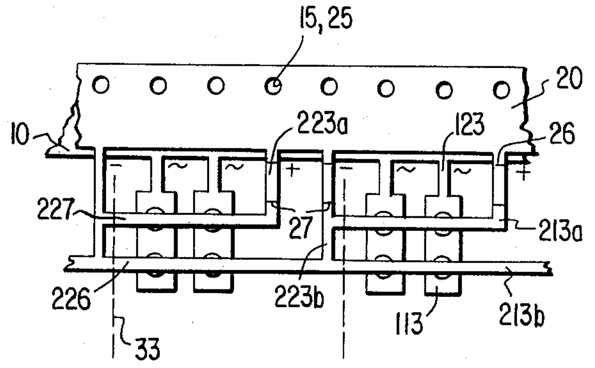
FIGS. 6–8 illustrate the mutual relationship between the two partial conductor bands for single phase bridge rectifying circuits constructed according to the method of the invention.
Figure 7:
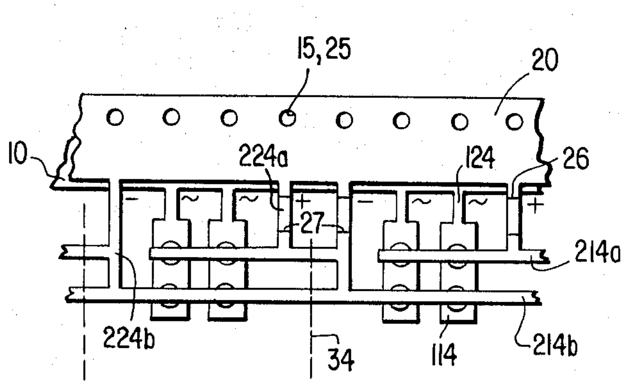
Figure 8:
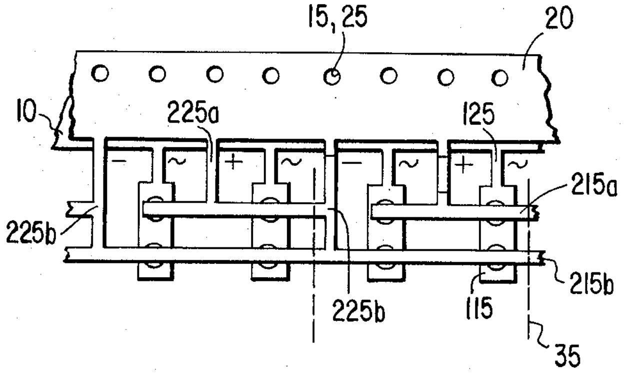

FIGS. 6 to 8 show embodiments for the production of single-phase bridge circuits each having a different succession of direct and alternating current leads. It is particularly the possibility of being able to arrange these current leads in a surprisingly simple manner in any desired sequence by the appropriate electrical orientation of the semiconductor wafers and/or by the appropriate mutual association of the conductor portions of both partial conductor bands intended for each circuit unit to produce rectifier arrangements with the desired circuitry, which represents a significant advantage of the method of the present invention. In each one of the three figures, the carrier plates or sections 113–115, respectively, which extend at right angles to the transporting strip 10 of the first partial conductor band are connected therewith via conductor portions 123 or 124 or 125, respectively, which serve as a.c. leads. Depending on the polarity sequence of the current leads for the desired circuit of the rectifier arrangement, the carrier plates of the first partial conductor tape are disposed either individually or in pairs alternatingly between conductor portions 223 or 224 or 225, respectively, of the second partial conductor tape thereabove, which conductor portions serve as d.c. leads, and are connected with the contact pieces 213 *a*, 213 *b* or 214 *a*, 214 *b* or 215 *a*, 215 *b*, respectively. The strip-shaped conductor portions and contact pieces of adjacent circuit sections of the second partial conductor tape are connected by suitably disposed auxiliary bar portions, e.g., portions 226, 227 of FIG. 6, so that a mechanically stable structure and interconnection of the partial conductor tapes is assured as it is required for the performance of the process. These bar portions are positioned so that they are severed when the bands are separated into individual devices. A semiconductor wafer is inserted between each one of the rectangularly overlapping conductor portions of each partial conductor band at their cross-over points. With the advantageous division of the partial conductor tapes the illustrated structure is simultaneously realized in a particularly economical manner for a plurality of arrangements. The separation into structural units in FIGS. 6–8 occurs along lines 33, 34, 35, respectively. The requirement for a sufficiently elastic behavior of the partial conductor sections intended as mounts for semiconductor wafers is met by the particular configuration of the partial conductor bands. To maintain a sufficient insulation space between the overlapping conductor portions of different electrical potential, the partial conductor sections passing between adjacent semiconductor wafers are bent over, if required.

Figure 9:
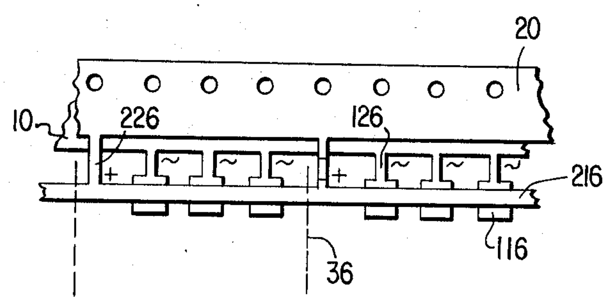
FIG. 9 illustrates the mutual relationship between the two partial conductor bands for a three phase star rectifying circuit constructed according to the invention.

FIG. 9 shows a structure for a three-phase star connection wherein the carrier plates or sections 116 with their conductor portions 126 of the first partial conductor band are overlapped at right angles by the conductor portions 216, 226 of the second conductor band in a similar manner as in the embodiment shown in FIG. 3. The partial conductor bands are here separated along the lines 36.

FIGS. 10*a* to 10*d* show the structure of a rectifier device consisting of a semiconductor wafer and conductor portions formed from two partial conductor bands which are of identical design.

Figure 10A:
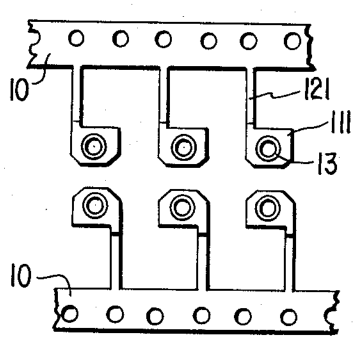
Figure 10B:
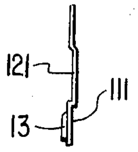
Figure 10C:
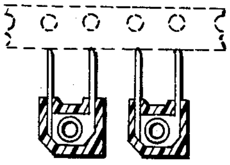
Figure 10D:

In FIG. 10*a* the two partial conductor tapes are shown in a planar association which correspond to that shown in FIG. 2. The carrier plate and contact piece for each semiconductor wafer are identically constructed and are indicated by the reference numeral 111. The indentation 13 is so dimensioned that with a wafer 6 therebetween sufficient electric insulation space is assured between the two conductor portions. FIG. 10*b* is a side view of a carrier plate 111 and its conductor 121. FIGS. 10*c* and 10*d* are schematic plan and side sectional views of a finished rectifier component with exposed element arrangement.

The coinciding design of the two partial conductor bands assures a particularly economical production of rectifier elements each having one semiconductor wafer. The partial conductor regions as they may be provided for holding and further contacting semiconductor wafers from two separate and differently designed partial conductor bands are fabricated in this case, for example, from only a single partial conductor band of the design shown in FIG. 10*a*. After one of the bands has been provided with the semiconductor wafers, both bands are placed together parallel to one another and are connected at desired points. The conductors are permanently connected with the semiconductor wafers by means of heat treatment or other solder techniques and are separated between two determined separating lines, respectively, up to the strips 10. The individual devices are subsequently encased in an insulating mass to provide a housing and then the leads 121 are separated from the strips 10 and individual rectifier devices tested.

The advantages of the present invention are that rectifier arrangements can be economically fabricated in any desired electrical connection with semiconductor wafers of any desired areal expanse and with an operating behavior which meets all the requirements, that partial conductor bands can be provided with semiconductor wafers in different spatial and electrical arrangements for any desired rectifier circuit, and that rectifier currents can be easily fabricated with any desired sequence of their connecting leads.

It will be understood that the above description of the present invention is susceptible to various modifications, changes and adaptations, and the same are intended to be comprehended within the meaning and range of equivalents of the appended claims.

I claim:

1. In a method for producing semiconductor rectifier circuit arrangements wherein strip-shaped current conductor portions which are intended for connection with semiconductor wafers are arranged to overlap one another at selected points in a relationship determined by the desired rectifier circuit, a semiconductor wafer is provided at each point of overlap and is inserted between the associated conductor portions and contacted with these, and the thus formed structure is subjected to further process steps, the improvement whereby a plurality of such semiconductor rectifier arrangements may be simultaneously and economically manufactured comprising:

forming, from a strip of planar conductive material, a first planar partial conductor band having periodically repeating conductor portions which are each provided with a planar section for the application and support of a semiconductor wafer and which are each connected to an edge zone of said band which serves as a transport strip;

forming, from a strip of planar conductive material, a second planar partial conductor band having periodically repeating conductor portions in a pattern determined by the conductor portions of said first partial band and the desired rectifier circuit, which conductor portions are each connected to an edge zone of the second partial conductor band and have planar contact sections for contacting a contact surface of the semiconductor wafers;

placing semiconductor rectifier wafers each with the desired electrical orientation, on the said planar sections of the conductors of said first partial band of conductors;

placing said second planar partial conductor band over said first partial conductor band so as to contact said semiconductor wafers with the associated conductors of said second band;

mechanically connecting said first and second partial conductor bands together via their said edge zones;

subjecting the thus formed band-shaped structure, consisting of said semiconductor wafers and said partial conductor bands which are in contact with said semiconductor wafers on either side thereof and which are firmly connected together, to further process steps of permanently bonding the wafers to the conductors, separating the conductors, if required, into desired circuit configurations and encapsulating the individual circuit configurations; and, separating said conductors from said edge zones to provide the individual desired rectifier circuit arrangements.

2. The method as defined in claim 1 wherein said sections of the first partial conductor tape which are intended for supporting the semiconductor wafers in a planar relationship are designed in strip shape and wherein said method further includes the step of providing each of said sections of said first band with an indentation for holding the semiconductor wafers.

3. The method as defined in claim 1 wherein the sections provided for contacting the semiconductor wafers in said second partial conductor band are provided in strip shape, are arranged along the side of the edge zone and are determined, insofar as concerns their number, expanse and mutual association, by the associated portion of said first partial conductor tape.

4. The method as defined in claim 1 wherein the patterns of the first and second partial conductor bands are produced by stamping or etching.

5. The method as defined in claim 1 wherein said second partial conductor band is placed on said first partial conductor tape with the edge zones coinciding and in an association determined by the intended circuitry and wherein said bands are permanently mechanically connected together by the permanent connection of their edge zones.

6. The method as defined in claim 1 wherein the edge zones of the two partial conductor bands are provided with a perforation having a corresponding spacing to aid in the alignment of the two conductor bands.

7. The method as defined in claim 1 wherein said wafers are permanently connected to said conductors in an immersion soldering process and wherein prior to said soldering said bandshaped structure consisting of the connected partial conductor bands and semiconductor wafer is divided into suitable lengths for such a soldering process.

8. The method as defined in claim 7 wherein prior to the placement of the semiconductor wafers on said sections of said first partial conductor band, each of said sections is provided with an indentation for holding the semiconductor wafer which indentation has an opening at the bottom thereof to aid in soldering of the wafer to the conductor of the first partial conductor band.

9. The method as defined in claim 1 wherein the strip-shaped conductor material has a thickness of 0.2 to 0.6 mm.

10. The method as defined in claim 9 wherein said strip-shaped conductive material is provided with easily solderable metallic coating.

* * * * *